United States Patent [19]

Saeki

[11] Patent Number: 5,896,221
[45] Date of Patent: Apr. 20, 1999

[54] OPTICAL AMPLIFYING SYSTEM HAVING MULTIPLE BRANCHING UNITS AND METHOD THEREFOR

[75] Inventor: Miwa Saeki, Tokyo, Japan

[73] Assignee: NEC Corporation, Tokyo, Japan

[21] Appl. No.: 08/900,780

[22] Filed: Jul. 25, 1997

[30] Foreign Application Priority Data

Aug. 1, 1996 [JP] Japan ............................ 8-203892

[51] Int. Cl.$^6$ .................................................. H01S 3/00
[52] U.S. Cl. ...................................................... 359/341
[58] Field of Search ............................... 359/341, 100, 359/345, 177

[56] References Cited

U.S. PATENT DOCUMENTS

| | | | |
|---|---|---|---|
| 4,178,073 | 12/1979 | Uchida et al. | |
| 5,471,334 | 11/1995 | Masuda et al. | 359/177 |
| 5,506,724 | 4/1996 | Shimizu et al. | 359/341 |
| 5,600,481 | 2/1997 | Nakabayashi | 359/341 |
| 5,706,126 | 1/1998 | Fujita | 359/341 |

FOREIGN PATENT DOCUMENTS 5-211482  8/1993  Japan .
7-162368  6/1995  Japan .
7-162371  6/1995  Japan .

OTHER PUBLICATIONS

Masayuki Nishimura, et al., "Low Noise Figure Erbium-Doped Fiber Amplifiers with Gain Adjustment by Pump Power Control", Topical Meeting on Optical Amplifiers and Applications, 1992, paper FB4, Technical Digest Series, vol. 17, 170–173, Optical Society of America, Washington, D.C.

*Primary Examiner*—Mark Hellner
*Attorney, Agent, or Firm*—McGinn & Gibb, P.C.

[57] ABSTRACT

An optical amplifier circuit includes an optical amplifying unit for amplifying a light signal having a predetermined wavelength to output an amplified light signal, first and second optical branching units each for branching a part of the amplified light signal to output branched light signals, and a band rejection optical filter for removing light within a center wavelength band to allow only spontaneous emission light to be selectively transmitted. A subtractor outputs a control signal according to a difference between the light signal branched by the first optical branching unit and the spontaneous emission light. A controller controls the output of the amplified light signal based on the control signal, thereby to maintain precisely a constant light output level.

24 Claims, 5 Drawing Sheets

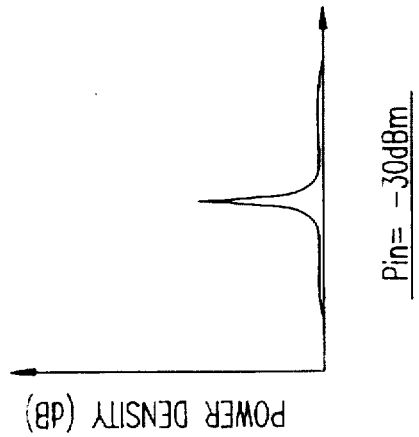
FIG.7A
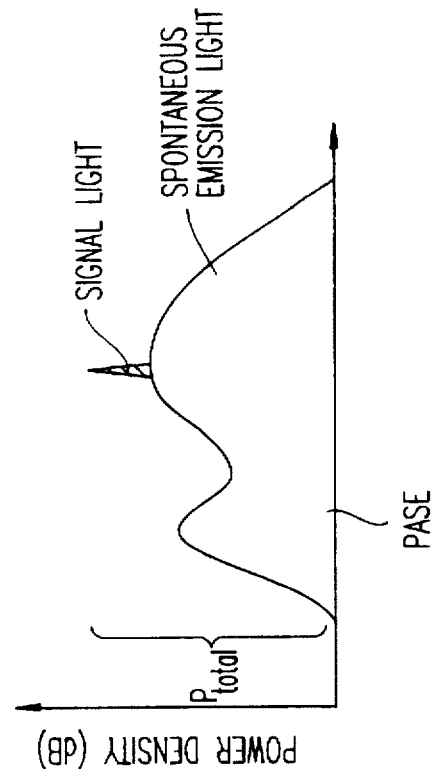
FIG.7D
FIG.7C
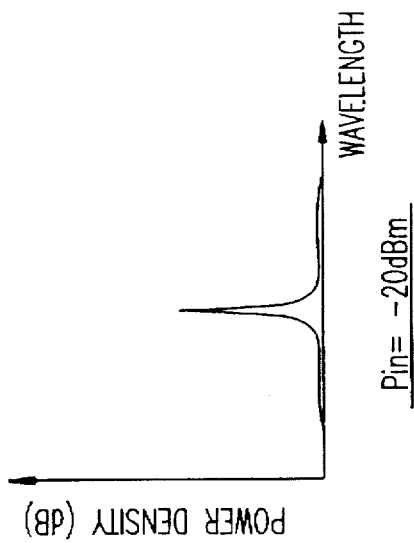
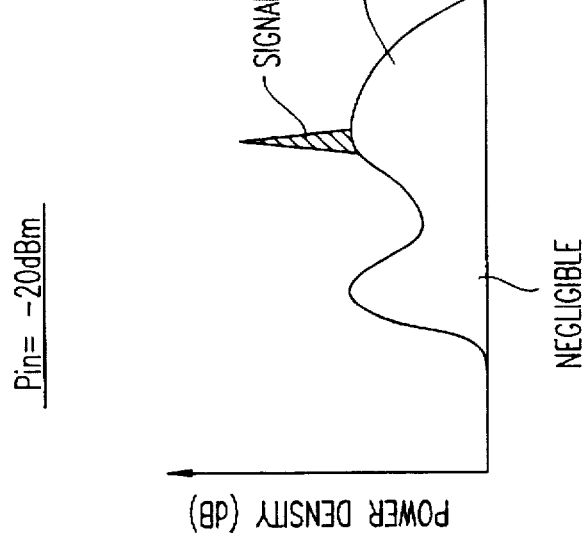
FIG.7B

OPTICAL AMPLIFYING SYSTEM HAVING MULTIPLE BRANCHING UNITS AND METHOD THEREFOR

BACKGROUND OF THE INVENTION

1. Field of the Invention

The present invention generally relates to an optical amplifier and method used in optical communication or optical information processing, and more particularly to an optical amplifier and method for accurately maintaining a uniform level of an amplified light signal.

2. Description of the Related Art

Conventional optical amplifiers which directly amplify light signals use, as an amplifying medium, an optical fiber with a core doped with a rare earth element, and a semiconductor amplifier using a stimulated emission phenomena. Stimulated emission phenomena is well-known, and is related to the emission properties of atoms and molecules at different optical frequencies, and occurs in semiconductors.

When optical amplifiers or similar devices are used for optical transmission, in order to keep the transmission level of a system constant and to stabilize transmission characteristics, the light signal output of an optical amplifier must be stable (e.g., kept constant). Thus, in a conventional optical fiber amplifier, such as that shown in FIG. 6, feedback control is commonly used.

Specifically, the conventional feedback control includes an optical branching unit 20 which is connected to an optical amplifying unit 10. A portion of the light is branched by the branching unit 20 to a light receiving unit 30. The light receiving unit 30 converts the light portion into an electrical signal, thereby to measure the level of the optical signal being output from the optical amplifying unit 10. The output of pumping (e.g., excitation) light from a pumping light source is controlled by a control circuit 51, so that the output is maintained at a constant level.

However, in conventional optical amplifiers, precisely maintaining a constant level of the amplified light signal is difficult. For purposes of this application, "precisely" means keeping a level constant within a certain tolerance range such as for example an amplifier operating with a power input signal Pin of −40 dBm, the tolerance is approximately 15.6 dB, for Pin of −30 dBm, the tolerance is approximately 6.4 dB, and for Pin of −20 dBm, the tolerance is approximately 1.2 dB. Obviously, these values are merely exemplary.

When an input signal power is more than −20 dBm, an effect of ASE power in total amplified signal power is negligible, as shown in FIGS. 7A and 7B. However, when the input signal power is less than −20 dBm, a rate of ASE power in total amplified power increases as input signal power decreases, as shown in FIGS. 7C–7D. For example, at −30 dBm input signal power, a rate of ASE power is approximately 1.4 dB in total amplified signal power (e.g., the output would be equal to $P_{ASE}/P_{total}=-1.4$ dB). Therefore, a gain set by a conventional optical amplifier would be lower (by −1.4 dB) than an original gain.

Moreover, in the conventional systems, even with feedback control, spontaneous emission light distorts the feedback process.

Further, the conventional systems typically include a bandpass filter which fails to maintain an accurate power signal output. In contrast, the invention uses a band rejection filter which is more accurate than a bandpass filter since the band rejection filter subtracts out the ASE light.

SUMMARY OF THE INVENTION

In view of the foregoing and other problems of the conventional systems, an object of the present invention to provide a structure and method for an optical amplifier which maintains a constant light output level.

In a first aspect of the present invention, an inventive optical amplifier is provided which includes an optical amplifying unit for amplifying a light signal, having a specific wavelength, and for outputting an amplified light signal. First and second optical branching units are provided, each branching unit branching the amplified light signal to output a branched light signal. A band rejection optical filter removes light within a predetermined center wavelength band (including the specific wavelength), and is connected to the second branching unit to allow only spontaneous emission light to be transmitted. A subtracting circuit outputs a control signal equal to the difference between the first branched light signal and the spontaneous emission light. An optical amplification controller controls an output of the amplified light signal based on the control signal.

Additionally, instead of the above-mentioned structure, an optical amplifier of the present invention may have the second optical branching unit positioned after the first branching unit so as to receive the first branched light signal.

Further, the optical amplifying unit includes a rare earth element-doped (e.g., Erbium-doped fiber for 1.55 μm wavelengths, Neodymium-doped fiber for 1.31 μm fiber, and Praseodymium-doped fiber) optical fiber, a pumping light source for outputting pumping light, and an optical coupler for coupling the light signal and the pumping light to the rare earth element-doped optical fiber. The optical amplification controlling circuit controls an injected current into the pumping light source in accordance with the control signal.

Further, the band rejection optical filter preferably includes a dielectric multi-layer optical filter, a fiber grating-type optical filter or a waveguide-type optical filter. Additionally, upstream (e.g., as related to the direction of light flow) of the band rejection optical filter, an optical isolator is provided for allowing only light propagating in an input direction to the band rejection optical filter to be transmitted. The optical isolator blocks light propagating in a direction opposite to the input direction.

The subtracting circuit preferably includes a first light receiving unit for converting the first branched light signal to a first electrical signal, and a second light receiving unit for converting the spontaneous emission light to a second electrical signal. The subtracting circuit, by determining a difference between the first electrical signal and the second electrical signal issues an output representing the difference, to the control circuit which calculates the control signal.

In the optical amplifier and method of the present invention, portions of the light from the optical amplifying unit are branched by the first and the second optical branching units, and the levels thereof are measured by the first and the second light receiving units, respectively. The optical filter removes a central wavelength of the light signal, and is positioned between the second branching unit and the second light receiving unit. The second light receiving unit measures the level of the filtered light. By subtracting the level of the filtered light from the output light measured by the first light receiving unit, only the central wavelength of the light signal is output to the control circuit.

Thus, the control circuit controls the optical amplifier so that the output of the optical amplifying unit is maintained at a constant level within the center wavelength range.

BRIEF DESCRIPTION OF THE DRAWINGS

The foregoing and other objects, aspects and advantages will be better understood from the following detailed description of preferred embodiments of the invention with reference to the drawings, in which:

FIG. 7A illustrates the spectrum of a light signal having a power of −20 dBm input into an optical amplifying unit of the conventional optical amplifier shown in FIG. 6;

FIG. 7B illustrates the spectrum of an amplified light signal (of −20 dBm) output from the optical amplifying unit of the conventional optical amplifier of FIG. 6;

FIG. 7C illustrates the spectrum of a light signal having a power of −30 dBm input into the optical amplifying unit of the conventional optical amplifier shown in FIG. 6; and FIG. 7D illustrates the spectrum of an amplified light signal (of −30 dBm) output from the optical amplifying unit of the conventional optical amplifier of FIG. 6.

DETAILED DESCRIPTION OF PREFERRED EMBODIMENTS OF THE INVENTION

Hereinbelow and prior to detailing the structure and method of the preferred embodiments of the present invention, the reason why the level of light output from conventional optical amplifiers cannot be kept constant (even if the optical amplifier is controlled through feedback) will be explained. Thereafter, a detailed discussion of the structure and method of the present invention will be provided, along with an explanation as to how the inventive structure overcomes the above-mentioned problem.

As discussed above, in conventional optical amplifiers, it is difficult to maintain a constant level of the amplified light signal, even if feedback control is utilized, because the spontaneous emission light distorts the feedback process.

Figure 6:
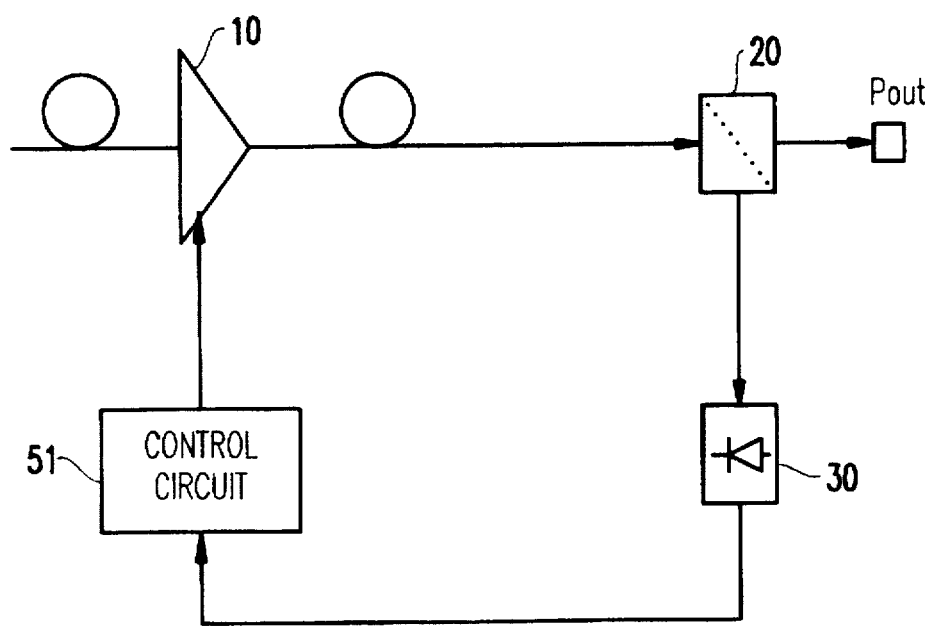
FIG. 6 is a schematic block diagram illustrating the structure of a conventional optical amplifier.

More specifically, the present inventor has discovered that in the conventional structure shown in FIG. 6, the portion of the amplified light signal that is branched and used for feedback control is unmodified (e.g., used as it is). However, when a light signal is amplified, spontaneous emission light is added to the light signal. If the ratio of the spontaneous emission light to the entire light output from the optical amplifier is changed by the amplifier, the apparent output of the amplified light signal also changes. This change distorts the control of the amplified light signal. Furthermore, the rate and variation of the spontaneous emission light in the light outputted from the optical amplifier is not constant and is dependent on the level of the input light signal.

Thus, the optical output from the optical amplifier includes the amplified optical signal as well as the amplified spontaneous emission (ASE) generated in the optical amplifier itself. The amplified spontaneous emission has a value within a wide spectral range, and its power changes with the input optical power of the optical amplifier. Thus, judging the amplified optical signal from the output power from the optical amplifier, is difficult.

Moreover, since the amplified light is directly received by the light receiving units (e.g., photodiodes/light sensors) for the feedback control, precisely maintaining a constant level of the output light is difficult with the influence of the amplified spontaneous emission. As mentioned above, the cause of the difficulty is believed to reside in the unnecessary feedback control of the otherwise constant level of the signal light which is caused by the change in the quantity of the amplified spontaneous emission which is contained in the amplified light.

In view of this discovery, the present inventor has determined that optical amplification must be controlled while also considering the variation of the spontaneous emission light. Thus, the inventive optical amplifier implements the following structure to overcome the above-described problem associated with the conventional optical amplifier.

First Embodiment

Figure 1:
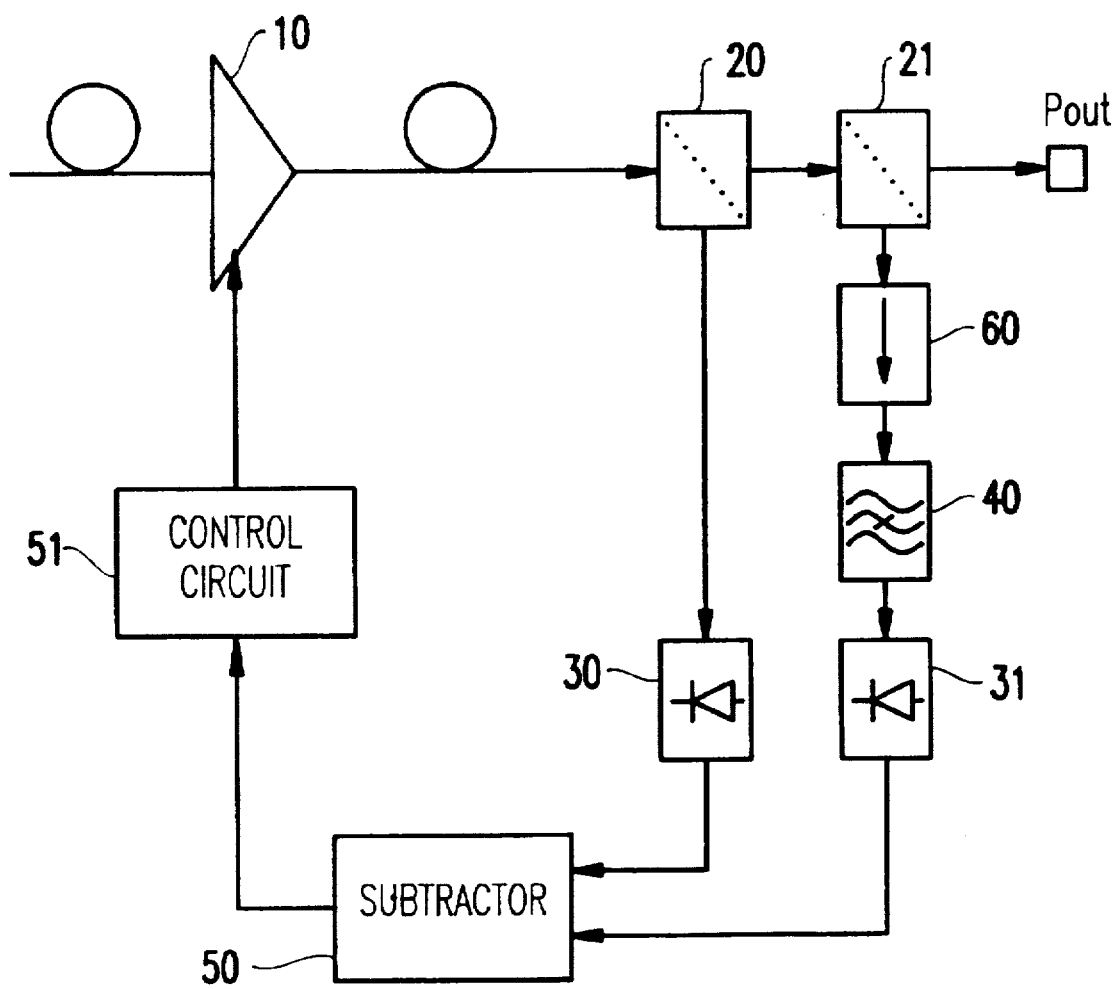
FIG. 1 is a schematic block diagram illustrating the structure of a first embodiment of an optical amplifier of the present invention.

Referring to FIG. 1, the structure of a first preferred embodiment of the optical amplifier of the present invention is illustrated, and includes an optical amplifying unit 10 for directly amplifying an input light signal. The optical amplifying unit 10 is preferably an optical fiber amplifier including an amplifying optical fiber and a pumping light source for inputting pumping light to the amplifying optical fiber. As mentioned above, the optical fiber is preferably a rare earth element-doped (e.g., Erbium, Neodymium, Praseodymium or the like) fiber. Additionally, the optical amplifying unit may be a semiconductor optical amplifier or the like.

A first optical branching unit 20 is positioned at the output side of the optical amplifying unit 10 and a second optical branching unit 21 is positioned downstream of the first optical branching unit. The branching units may comprise an optical branching coupler or the like (e.g., a beam splitter or the like). It is noted that the optical devices (e.g., including optical branching units 20 and 21) are integrally formed in one module/casing, thereby resulting in a smaller overall system.

The light branched by the optical branching unit 20 is input into a light receiving unit 30 (e.g., a photodiode, a light sensor or the like), and the level thereof is measured. Similarly, the level of the output light of the optical branching unit 21 is measured by a light receiving unit 31, after it passes an optical isolator 60 and a band rejection filter 40. Light receiving units 30, 31 may be conventional light sensors.

The band rejection filter (e.g., having a function opposite that of the bandpass filter) 40, positioned between the optical isolator 60 and the light receiving unit 31, removes only the light signal wavelength component. More specifically, the band rejection filter removes a narrow band of light. Thus, only light with predetermined specific wavelengths is allowed to pass.

An optical isolator 60 is coupled between the second optical branching unit 21 and the band rejection filter 40. Optical isolator 60 functions as a one-way valve, and prevents the light that is removed by the band rejection filter from returning to and interfering with the transmission path. The structure of the optical isolator is believed to be well-known, and thus for brevity will not be further described herein.

Figure 2A:
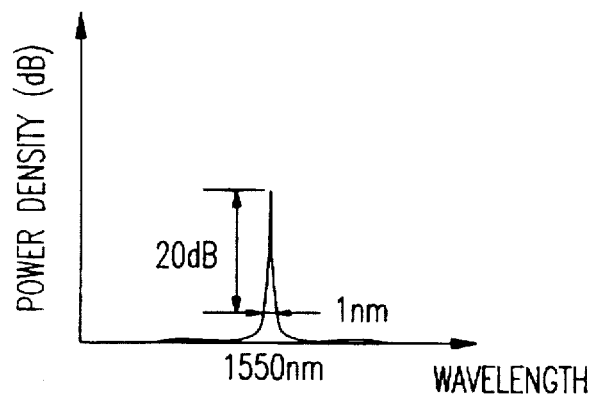
FIG. 2A shows the spectrum of a light signal input into an optical amplifying unit of the optical amplifier of FIG. 1 according to the present invention.
Figure 2B:
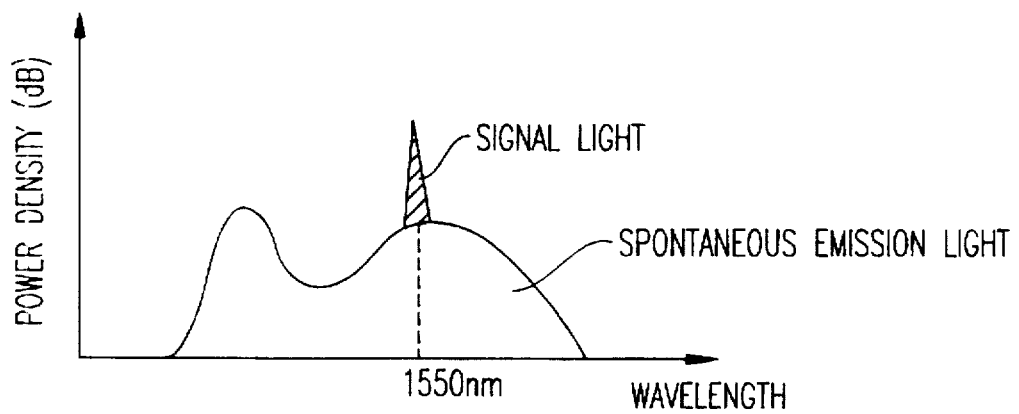
FIG. 2B shows the spectrum of an amplified light signal output from the inventive optical amplifying unit of FIG. 1.
Figure 2C:
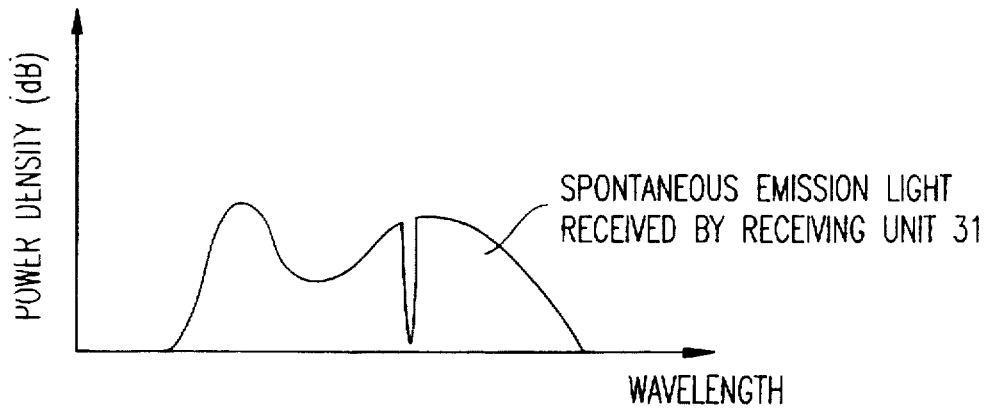
FIG. 2C shows the spectrum of spontaneous emission light input into a light receiving unit of the optical amplifier shown in FIG. 1.

FIGS. 2A–2C illustrate the operation of the optical amplifier of the present invention. FIG. 2A illustrates a sample spectrum of a light signal input into the optical amplifying unit 10. In this exemplary embodiment, the center of the wavelength is approximately 1550 nm and a 20 dB suppression width is approximately 1 nm.

FIG. 2B illustrates the light signal after it has been amplified by the amplifying unit 10. The optical amplifying unit 10 adds spontaneous emission light to the original input signal.

As discussed above, the light signal is branched by the optical branching unit 20, and is measured by the light receiving unit 30. The light received (and sensed) by the light receiving unit 30 includes the wavelength components illustrated in FIG. 2B. That is, the power Pt of the output light of the optical amplifying unit 10 is the sum of the light signal Ps and the (amplified) spontaneous emission light Pase, and is expressed by the following Equation (1).

$$Pt = Ps + Pase \quad (1)$$

The band rejection filter 40 has a reflectivity of not less than 97% at a center wavelength of approximately 1500 nm and a bandwidth of ±5 nm. Optical branching unit 21 passes the amplified light signal illustrated in FIG. 2B through the band rejection filter 40, so that the wavelength component of the signal (i.e., wavelength of 1550±5 nm) is removed, to produce the light signal component illustrated in FIG. 2C. While 1550 nm is used in the foregoing example, the invention is not limited thereto and is equally applicable to all useful optical wavelengths.

The light receiving unit 31 measures the light signal component illustrated in FIG. 2C (which contains primarily the spontaneous emission light component and very little, if any, of the signal light component). The output light power Pase of the optical amplifying unit 10 received by the light receiving unit 30 can be approximately represented by the following Equation (2) using light power Pr received by the light receiving unit 31 and a proper proportionality constant α.

$$Pase = \alpha Pr \quad (2)$$

From Equations (1) and (2), the following Equation (3) is obtained, thereby allowing the optical output of the amplified signal light to be approximately calculated using the optical outputs Pt and Pase which are measured by the light receiving units 30 and 31.

$$Ps = Pt - \alpha Pase \quad (3)$$

Subtracting unit 50 subtracts the output of light receiving unit 31 from light receiving unit 30 in accordance with Equation (3), and outputs a monitor signal to control circuit 51. The subtracting unit 50 preferably comprises an operational amplifier or the like. The monitor signal represents (e.g., is proportional to) a true light signal free of spontaneous emission light, and is used by the control circuit 51 to control the output of the optical amplifying unit 10 to keep the monitor signal constant.

For example, the control circuit 51 issues a signal to the amplifying unit 10 to control the gain thereof, so as to produce the amplified light signal at a constant level. Therefore, with the invention the output level of the amplified light signal can be maintained at a constant level and controlled with high precision.

It is noted that the proportionality constant α mentioned above may be preset to a value which is predetermined so that the result of the operation according to Equation (3) is zero when no signal light is inputted to the optical amplifying unit 10. Further, other factors which affect the selection of the proportionality constant include the input power level and the pumping power employed.

Thus, the optical branching paths (and units) employed in the first embodiment result in a greater accuracy in maintaining the output power level.

Further, the band-rejection filter used instead of the bandpass filter of the conventional systems allows a more accurate power output signal. Specifically, the band-rejection filter allows a more accurate calculation (e.g., at the controller using the above equations), as compared to a bandpass filter.

Second Embodiment

Figure 3:
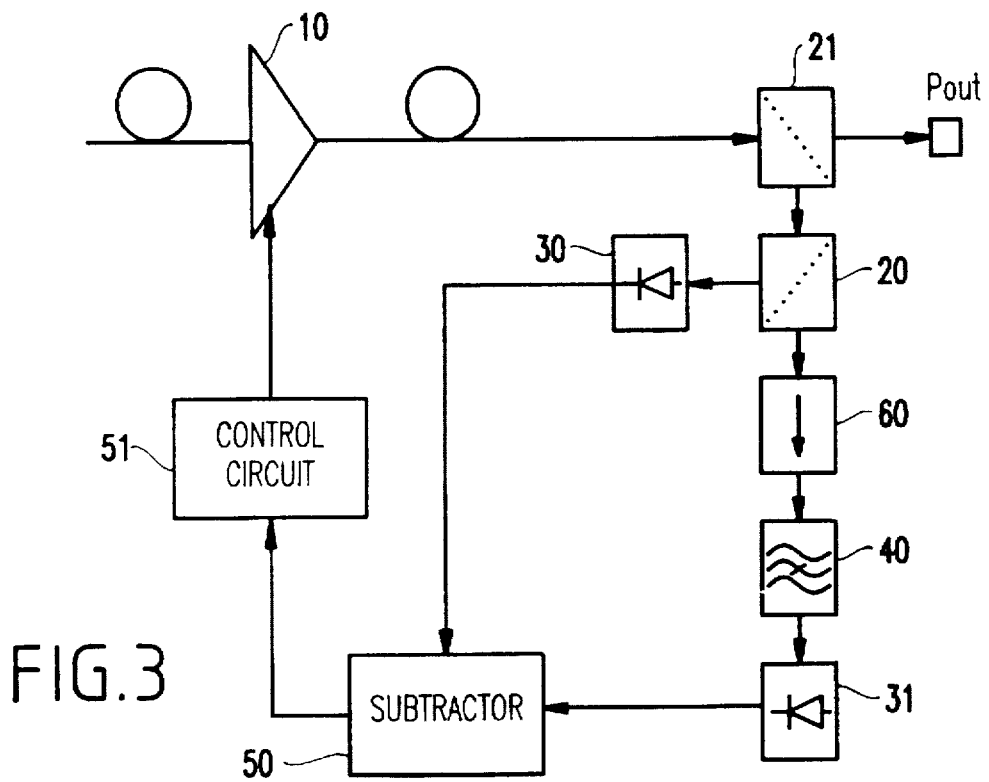
FIG. 3 is a schematic block diagram illustrating the structure of a second embodiment of the optical amplifier according to the present invention.

FIG. 3 illustrates a second embodiment of an optical amplifier according to the present invention. The same elements discussed with respect to the first embodiment shown in FIG. 1 are identified with the same reference numerals for ease of understanding. Further, for brevity, a description of these elements will not be repeated, but rather only the differences will be detailed.

The second embodiment shown in FIG. 3 is different from the first embodiment shown in FIG. 1 in that the optical branching unit 20 for branching (and controlling) the amplified signal described above is positioned between the optical branching unit 21 and the optical isolator 60. The basic operation of the embodiment is similar to that of the embodiment shown in FIG. 1. However, by using this structure illustrated in FIG. 3, the optical elements are positioned so as to reduce the optical transmission path.

Specifically, in the second embodiment, the insertion loss is reduced, as compared to the first embodiment, since two optical devices are not needed in series as in the first embodiment. The insertion loss is greater in the first embodiment since first and second optical branching units (e.g., optical branching units 20, 21) are provided in series, between the amplifying unit 10 and the output. With each branching unit provided on the transmission path, insertion loss becomes greater. In the second embodiment, only one optical branching unit (e.g., optical branching unit 21) is employed on the transmission path (e.g., between amplifying unit 10 and the output). Thus, in the second embodiment, efficiency is increased and the output power (e.g., Pout) is increased compared to the first embodiment.

Since the optical transmission path is reduced, the light output power requirement can be decreased as compared with the structure shown in FIG. 1. Further, in the second embodiment, the difference between the two paths to the subtractor 50 is reduced.

Third Embodiment

Figure 4:
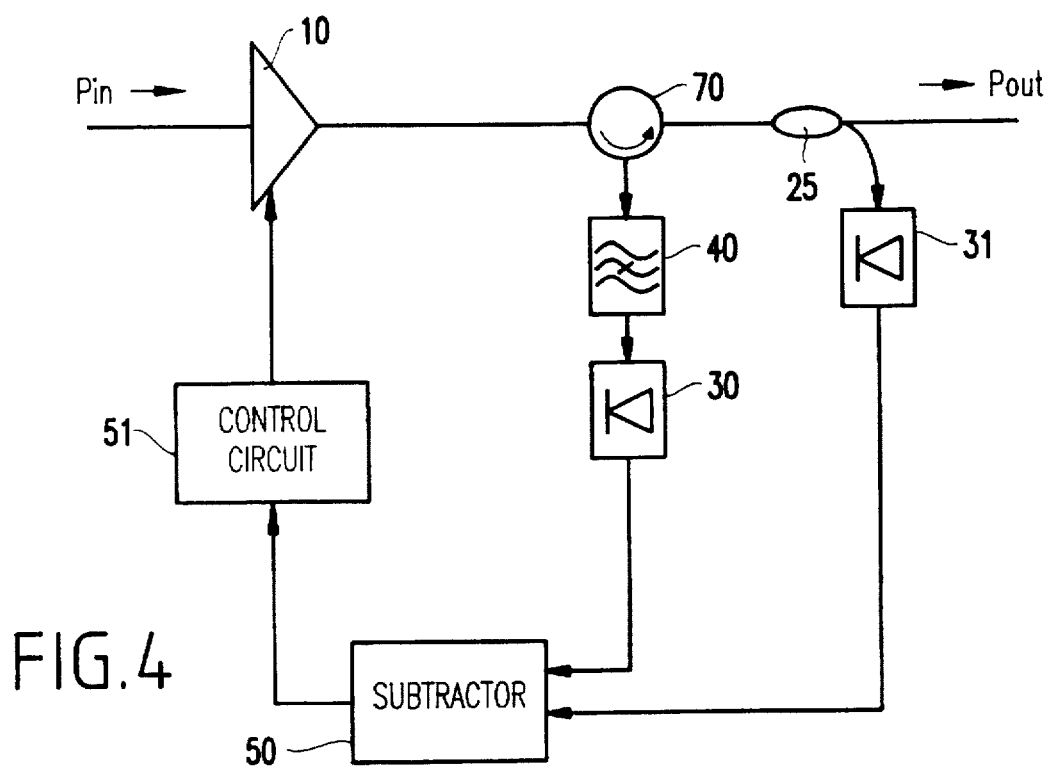
FIG. 4 is a schematic block diagram illustrating the structure of a third embodiment of an optical amplifier of the present invention.

FIG. 4 illustrates a third embodiment of an optical amplifier according to the present invention. The same elements discussed with respect to the first embodiment shown in FIG. 1 are identified with the same reference numerals for ease of understanding. Further, for brevity, a description of these elements will not be repeated, but rather only the differences will be detailed.

The third embodiment shown in FIG. 4 is different from the first embodiment shown in FIG. 1 in that an optical circulator 70 is positioned downstream from an output of the optical fiber amplifier 10 and upstream from an optical branching unit 25 (e.g., an optical coupler 25). The optical circulator 70 operates as a "valve" for passing light between a band-rejection filter 40 and to an optical coupler 25, and is used instead of the optical branching unit 21 and optical isolator 60.

In operation, light is passed to the band-rejection filter 40 from the optical circulator 70. The band-rejection filter reflects the optical signal (e.g., having a wavelength of 1550 nm) back to the optical circulator 70. The reflected light includes signal light and ASE light having a 1550 nm wavelength. The other light (e.g., having a wavelength other than 1550 nm) received by the band-rejection filter 40 is passed to the photo-diode 30. The light received by the photo-diode 30 is the same as that shown in FIG. 2C.

Figure 5:
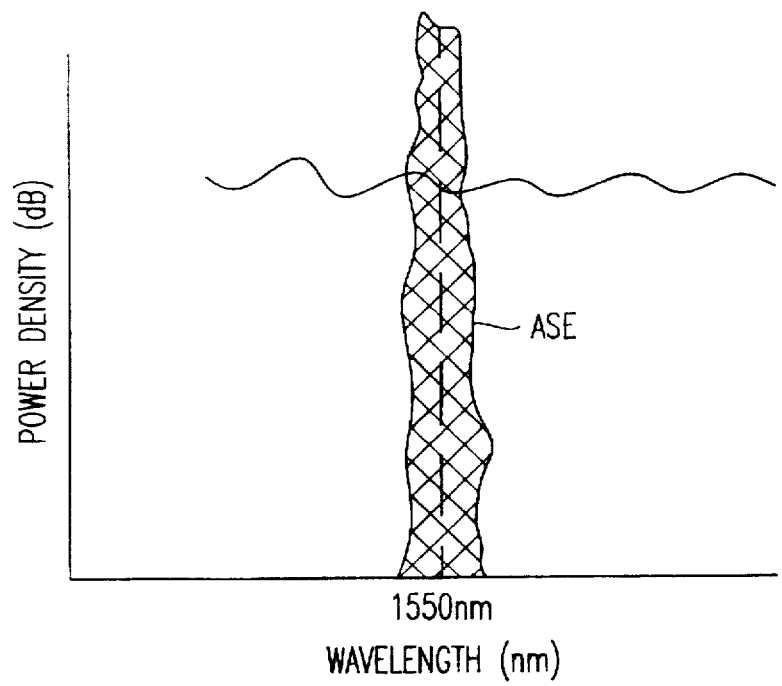
FIG. 5 shows the spectrum of spontaneous emission light input into a light receiving unit (e.g., photodiode 31) of the optical amplifier shown in FIG. 4.

The reflected light from the band-rejection filter 40 is received by the optical branching unit 25 (e.g., coupler) via the optical circulator 70. The optical branching unit 25 outputs the reflected light (e.g., signal light and ASE light) having a 1550 nm wavelength to the photodiode 31. The light received by photodiode 31 is as shown in FIG. 5.

Similarly to the first embodiment, a subtractor 50 receives output signals from the photodiodes 30, 31 and provides a difference signal to the control circuit 51, thereby to control the optical fiber amplifier 10.

In the third embodiment, there is no second branching unit as in FIG. 1. Thus, an advantage of the third embodiment is that the second optical branching unit is not needed since the optical circulator 70 performs the function of optical branching unit 21 in the first embodiment. Thus, the insertion loss is much less than in the first embodiment of FIG. 1.

Further, the ASE light power is lower in this embodiment (similarly to the second embodiment)

While the optical amplifying unit 10 is discussed above as an optical fiber amplifying unit, it could be replaced with an optical semiconductor amplifying unit, depending upon the specific application and the designer's constraints and requirements.

The band rejection optical filter 40 may include a dielectric multi-layer interference filter, a fiber grating-type optical filter, a waveguide-type filter or similar device, as is known by those ordinarily skilled in the art. For example, the band rejection optical filter may be a fiber grating-type filter formed such that a Bragg refraction grating is created on an optical fiber using an ultraviolet ray-induced refractive index change of a core fiber doped with Ge, and functioning as a reflecting filter to reflect only the light of a specified wavelength. The fiber grating has been widely developed recently, and the basic principle, structure and the like are disclosed, for example, in "Fiber Grating", Laser Research, Vol. 23, No. 10 (October, 1995).

Similarly, the waveguide-type filter may, for example, be a Mach-Zehnder-type optical filter or other similar filter as is known by those ordinarily skilled in the art.

Thus, the present inventor has discovered why conventional optical amplifiers cannot attain a highly-precise constant output, even when a feedback control is used. To overcome this problem, the present inventor has designed a novel and unobvious feedback control method and system wherein the amplified light signal is branched into two light signals. One light signal is modified to remove the component substantially near a center wavelength of the amplified light signal to extract only the spontaneous emission light. Then, the output level of pure amplified light signal is calculated by subtracting the spontaneous emission light from the entire light output level of the optical amplifying unit, and the difference signal is used for the feedback control. Accordingly, with the above-described inventive structure, the output level may be controlled to be constant and with high precision irrespective of the variation of ratio of the spontaneous emission light.

While the invention has been described with reference to preferred embodiment described above, it is not limited thereto and includes all variations known to those ordinarily skilled in the art.

Having thus described my invention, what I claim as new and desire to secure by Letters Patent is as follows:

1. An optical amplifying system, comprising:
   an optical amplifier for optically amplifying a light signal having a predetermined wavelength, and for outputting an amplified light signal;
   a first optical branching unit for branching a portion of said amplified light signal;
   a second optical branching unit for branching a portion of said amplified light signal;
   a filter for removing light substantially within a predetermined wavelength band from light branched by said second branching unit such that remaining spontaneous emission light is selectively transmitted;
   a subtractor for subtracting said spontaneous emission light from light branched by said first branching unit, to produce a control signal; and
   a controller for controlling an output of said optical amplifier based on said control signal.

2. The optical amplifying system as in claim 1, further comprising an output unit for receiving a second output from said second branching unit, and a transmission path connecting said optical amplifier and said output unit,
   wherein said second branching unit is directly connected to said transmission path.

3. The optical amplifying system as in claim 1, further comprising an output unit for receiving a second output from said second branching unit, and a transmission path connecting said optical amplifier and said output unit,
   wherein said first branching unit is directly connected to said transmission path and said second branching unit is connected to said first branching unit.

4. The optical amplifying system as in claim 1, wherein said optical amplifier comprises:
   a rare earth element-doped optical fiber;
   a pumping light source for outputting a pumping light; and
   an optical coupler for coupling said light signal and said pumping light to said rare earth element-doped optical fiber.

5. The optical amplifying system as in claim 4, wherein said controller comprises means for controlling an injected current into said pumping light source according to said control signal.

6. The optical amplifying system as in claim 1, wherein said filter comprises a band rejection optical filter for reflecting light within a center wavelength and allowing only said spontaneous emission light to be transmitted.

7. The optical amplifying system as in claim 6, farther comprising an optical isolator positioned between said second branching unit and said filter,
   said optical isolator for allowing light propagating in an input direction to pass and for blocking light propagating in a direction opposite to said input direction.

8. The optical amplifying system as in claim 7, wherein said filter comprises at least one of a dielectric multi-layer optical filter, a fiber-grating optical filter, and a waveguide optical filter.

9. The optical amplifying system as in claim 1, wherein said filter reflects light within said predetermined wavelength to allow only spontaneous emission light to be selectively transmitted.

10. The optical amplifying system as in claim 1, wherein said filter comprises at least one of a dielectric multi-layer optical filter, a fiber-grating optical filter, and a waveguide optical filter.

11. The optical amplifying system as in claim 7, wherein said subtractor comprises:

a first light receiving unit for converting light branched by said first branching unit to a first electrical signal;

a second light receiving unit for converting said spontaneous emission light to a second electrical signal; and a differential circuit for calculating a difference between said first electrical signal and said second electrical signal.

12. A method of optically amplifying an input signal, said method comprising:

branching, by a first branching unit, a portion of an amplified light signal;

branching, by a second branching unit, a portion of said amplified light signal;

removing light substantially within a predetermined wavelength band from light branched by said second branching unit such that remaining spontaneous emission light is selectively transmitted; and subtracting said spontaneous emission light from light branched by said first branching unit, to produce a control signal.

13. The method according to claim 12, further comprising:

optically amplifying a light signal having a predetermined wavelength, thereby to output said amplified light signal to said first branching unit; and controlling an output of said optical amplifier based on said control signal.

14. The method according to claim 13, further comprising:

providing an output unit for receiving a second output from said second branching unit, and a transmission path connecting said optical amplifier and said output unit, wherein said second branching unit is directly connected to said transmission path.

15. The method according to claim 13, further comprising providing an output unit for receiving a second output from said second branching unit, and a transmission path connecting said optical amplifier and said output unit, wherein said first branching unit is directly connected to said transmission path and said second branching unit is connected to said first branching unit.

16. The method according to claim 13, further comprising providing an optical amplifier comprising:

a rare earth element-doped optical fiber;

a pumping light source for outputting a pumping light; and an optical coupler for coupling said light signal and said pumping light to said rare earth element-doped optical fiber.

17. The method according to claim 16, wherein said controlling comprises controlling an injected current into said pumping light source according to said control signal.

18. The method according to claim 17, wherein said removing comprises providing a band-rejection optical filter for reflecting light within said central wavelength and allowing only said spontaneous emission light to be transmitted, and wherein said subtracting comprises:

converting light branched by said first branching unit to a first electrical signal;

converting said spontaneous emission light to a second electrical signal; and calculating a difference between said first electrical signal and said second electrical signal.

19. An optical amplifying system, comprising:

a first optical branching unit for branching a portion of an amplified light signal;

a second optical branching unit for branching a portion of said amplified light signal;

a filter for removing light substantially within a predetermined wavelength band from light branched by said second branching unit such that only remaining spontaneous emission light is selectively transmitted; and a subtractor for subtracting said spontaneous emission light from light branched by said first branching unit, to produce a control signal.

20. The optical amplifying system according to claim 19, further comprising:

an optical amplifier for optically amplifying a light signal having a predetermined wavelength, thereby to output said amplified light signal to said first branching unit; and a controller for controlling an output of said optical amplifier based on said control signal.

21. The optical amplifying system according to claim 19, further comprising an output unit coupled to an output of said second branching unit, said second branching unit being coupled in series between said output unit and an output of said first branching unit.

22. The optical amplifying system according to claim 19, further comprising an output unit coupled to a first output of said first branching unit, and said second branching unit being coupled to a second output of said first branching unit.

23. An optical amplifying circuit, comprising:

an optical circulator for directing an amplified light;

a filter for removing light substantially within a predetermined wavelength band from said amplified light received from said optical circulator and transmitting said light having said predetermined wavelength to said optical circulator, and for passing second light having a wavelength other than said predetermined wavelength, said light having said predetermined wavelength including remaining spontaneous emission light;

an optical branching unit for receiving and branching said light having said predetermined wavelength from said optical circulator; and a subtractor for subtracting said spontaneous emission light from said second light transmitted from said filter, to produce a control signal.

24. The amplifying system according to claim 23, wherein said optical branching unit comprises an optical coupler, and said filter comprises at least one of a dielectric multi-layer optical filter, a fiber-grating optical filter, and a waveguide optical filter.

* * * * *